UNITED STATES PATENT OFFICE.

B. MARGULIES, OF TRIESTE, AUSTRIA, ASSIGNOR TO JESSE AND JAS. W. TYSON, OF BALTIMORE, MARYLAND.

IMPROVEMENT IN THE MANUFACTURE OF THE SALTS OF CHROMIUM.

Specification forming part of Letters Patent No. 49,682, dated August 29, 1865.

*To all whom it may concern:*

Be it known that I, BENEDICT MARGULIES, of Trieste, in the Empire of Austria, have invented a new and Improved Mode of Manufacturing the Salts of Chromium, Chromates, and Bichromates from Chrome Ore; and I do hereby declare that the following is a full and exact description thereof.

I take a mixture of finely-powdered chrome ore and other materials ordinarily used in the manufacture of said salts of chromium, chromates, and bichromates, and form it into blocks by pressing it together either in a dry state or after the addition of water. These blocks may be of any size or shape; but I prefer to make them in the shape of a cone eighteen to twenty-four inches high, eight inches wide at top, and nine inches wide at the base. I expose the blocks, of whatever size or shape they may be, either dry or in a moist state, to the heat of a furnace till the chrome ore is wholly or in part decomposed. I then take the blocks and place them in any convenient vessel and dissolve out the salts of chromium or chromates with water, and treat the solution in any of the usual methods for the manufacture of chrome salts. Hitherto it has been usual to manufacture the salts of chromium, chromates, and bichromates by taking a mixture of chrome ore in a finely-divided state, with the other materials ordinarily used, and spreading the same on the bed of a reverberatory furnace, so as to expose as large a surface as possible to the action of the heat and oxidizing influences of the heated gases contained within the furnace, and by frequent stirring of the mixture to expose fresh surfaces to the action of the heated air until the chrome ore has been either wholly or partially decomposed. Now my process is precisely opposite.

I have not found it possible in ordinary practice to produce any oxidizing-flame perfectly pure, because the heated air within the furnace is always more or less mixed with carbon or other reducing-gases, and consequently that part of the mixture which may have been advanced in the process of oxidation is liable to be robbed of its oxygen and again reduced into an insoluble state by any unconsumed carbon or other reducing-gases which may be floating in the furnace. Therefore I form the mixture into a compact mass, so as to expose as little surface to the flame as possible consistent with the proper heating of the block, and leave it to the particles of which the mass is composed to decompose each other under the influence of heat.

I do not wish to confine myself to the exact details as herein set forth; but

What I claim, and desire to secure by Letters Patent, is—

The herein-described process for the manufacture of the salts of chromium.

Witness my hand and seal at Vienna, in the Empire of Austria, this 25th day of February, A. D. 1865.

B. MARGULIES. [L. S.]

Signed and sealed in the presence of—
Dr. A. BRIT,
R. BURTCH.